*(12)* United States Patent
Moran et al.

(10) Patent No.: US 9,930,181 B1
(45) Date of Patent: Mar. 27, 2018

(54) SYSTEMS AND METHODS FOR OPTIMAL SCHEDULING OF RESOURCES IN A CONTACT CENTER

(71) Applicant: Avaya Inc., Basking Ridge, NJ (US)

(72) Inventors: Thomas Moran, Galway (IE); Gerard Carty, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/395,349

(22) Filed: Dec. 30, 2016

(51) Int. Cl.
*H04M 3/00* (2006.01)
*H04M 5/00* (2006.01)
*H04M 3/523* (2006.01)
*G06Q 10/06* (2012.01)

(52) U.S. Cl.
CPC .. *H04M 3/5238* (2013.01); *G06Q 10/063118* (2013.01); *H04M 2203/402* (2013.01)

(58) Field of Classification Search
CPC .. H04M 3/523; H04M 3/5232; H04M 3/5233; H04M 3/51
USPC ............ 379/265.02, 265.01, 265.05, 265.11, 379/265.12, 266.01, 266.08, 265.07, 379/265.1
See application file for complete search history.

(56) References Cited

U.S. PATENT DOCUMENTS

| | | | |
|---|---|---|---|
| 7,103,562 B2 | 9/2006 | Kosiba et al. | |
| 8,015,042 B2 | 9/2011 | Seetharaman et al. | |
| 8,108,237 B2 | 1/2012 | Bourne et al. | |
| 8,234,141 B1 | 7/2012 | Flockhart et al. | |
| 8,634,543 B2 | 1/2014 | Flockhart et al. | |
| 9,455,930 B2 | 9/2016 | McCormack et al. | |
| 9,635,177 B1* | 4/2017 | Hoffberg | H04M 3/5175 |
| 2003/0174830 A1* | 9/2003 | Boyer | H04M 3/51 379/265.02 |
| 2015/0350431 A1 | 12/2015 | Steiner et al. | |
| 2015/0358463 A1 | 12/2015 | O'Connor et al. | |
| 2015/0358468 A1 | 12/2015 | Erhart et al. | |

OTHER PUBLICATIONS

U.S. Appl. No. 15/893,846; entitled "Systems and Methods for Optimal Scheduling of Resources in a Contact Center," filed Feb. 12, 2018 by Thomas Moran et al.

* cited by examiner

*Primary Examiner* — Thjuan K Addy
(74) *Attorney, Agent, or Firm* — Stevens & Showalter, LLP

(57) ABSTRACT

Managing resources in a contact center including assigning each resource to one of a first set of resources each comprising a proficiency level above a first threshold for a first resource attribute, or a second set of resources each comprising a proficiency level below the first threshold for the first resource attribute and a proficiency level above a second threshold for a second resource attribute. An expected number of contacts requiring resources possessing one of the first or second resource attribute is predicted for a time period, and a correlation between the first and second resource attribute is identified. Based on the correlation, a minimum number of resources from each set required to handle the expected number of contacts at a predetermined service level for the time period is forecasted. The minimum number of resources from the first set is less than a number of resources required without the correlation.

20 Claims, 8 Drawing Sheets

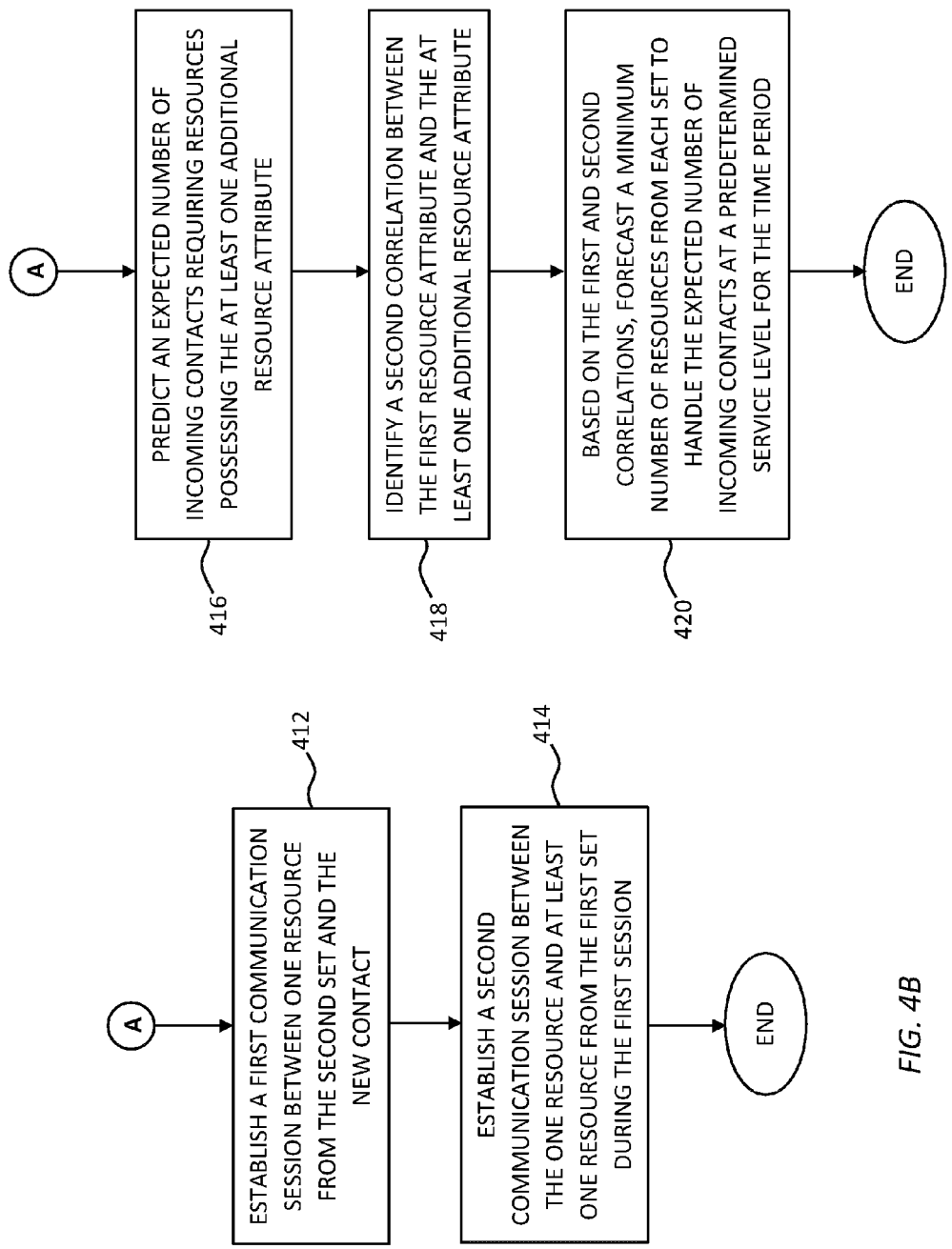

SYSTEMS AND METHODS FOR OPTIMAL SCHEDULING OF RESOURCES IN A CONTACT CENTER

BACKGROUND

The present disclosure relates generally to workforce management in a contact center, and, more particularly, to optimal scheduling of resources in the contact center.

In a contact center, the human agents typically represent a large percentage of the operating cost. As a result, an efficient workforce management system, particularly with respect to optimal scheduling of resources, has become an increasingly important component of effective contact center management. Existing contact centers typically track each resource's skillset(s) and utilize data from one or more sources, including historical data captured from automatic call distribution (ACD) systems in the contact center, to predict future staffing needs and the associated resource skillset mix that will be required to service incoming contacts. An inaccurate prediction may result in a resource roster with too many resources, which increases labor cost. Inaccurate predictions may also result in too few resources with the appropriate skills being scheduled or too few resources overall, both of which may severely impact service levels, increase customer frustration, and generally degrade the customer experience.

Modern, attribute-based contact centers assign one or more attributes to each incoming contact and make routing decisions based on matching of the contact attributes with the attributes of the resources. Information related to these contact attributes may be incorporated into staffing predictions, which results in better forecasting of contact center staffing needs and better matching between incoming contacts and the resources available for assignment.

While the increased granularity of an attribute-based contact center may result in more accurate forecasts of incoming contacts and staffing needs, the practicality of scheduling resources in the contact center may result in significant compromises being made with the resource roster, such that some benefits of the attribute-based model may not be realized. For example, an attribute-based contact center may be able accurately predict that contacts with a certain set of attributes are more likely to occur at one point during the workday, e.g., early morning, and that the contact type will change to a different mix of attributes during a different part of the workday, e.g., late morning. Because resource shifts at a contact center typically consist of at least a half day (four hours), it is often impractical to create a resource roster that may be changed dynamically to exactly match this prediction.

BRIEF SUMMARY

One aspect of the present disclosure relates to a method for managing a plurality of resources in a contact center. This method includes assigning, by a contact center processor, each resource to one of: a first set of resources each comprising a proficiency level above a first threshold for a first resource attribute, or a second set of resources each comprising a proficiency level below the first threshold for the first resource attribute and a proficiency level above a second threshold for a second resource attribute. The method also includes predicting, by the contact center processor, for a time period, an expected number of incoming contacts requiring resources possessing one of the first resource attribute or the second resource attribute; identifying, by the contact center processor, a correlation between the first resource attribute and the second resource attribute; and based on the correlation, forecasting, by the contact center processor, a minimum number of resources from each of the first set of resources and the second set of resources to handle the expected number of incoming contacts at a predetermined service level for the time period. The minimum number of resources from the first set of resources is less than a number of resources required without the correlation.

Another aspect of the present disclosure relates to another method for managing a plurality of resources in a contact center. The method includes assigning, by a contact center processor, each resource to one of: a first set of resources each comprising a proficiency level above a first threshold for a first resource attribute, or a second set of resources each comprising a proficiency level below the first threshold for the first resource attribute and a proficiency level above a second threshold for a second resource attribute. The method also includes predicting, by the contact center processor, for a time period: an expected first number of incoming contacts requiring resources possessing the first resource attribute, and an expected second number of incoming contacts requiring resources possessing the second resource attribute. The expected first number of incoming contacts historically resulted in scheduling of a first number of resources from the first set of resources to handle the expected first number of incoming contacts at a predetermined service level for the time period. The method further includes identifying, by the contact center processor, a correlation between the first resource attribute and the second resource attribute; and based on the correlation, forecasting, by the contact center processor, a minimum number of resources from each of the first set of resources and the second set of resources to handle the expected first and second numbers of incoming contacts at the predetermined service level for the time period. The minimum number of resources from the first set of resources is less than the first number of resources.

A further aspect of the present disclosure relates to a system for managing a plurality of resources in a contact center. This system includes a memory device, storing executable instructions, and a processor in communication with the memory device. In particular, the processor, when executing the executable instructions, assigns each resource to one of: (i) a first set of resources each comprising a proficiency level above a first threshold for a first resource attribute, or (ii) a second set of resources each comprising a proficiency level below the first threshold for the first resource attribute and a proficiency level above a second threshold for a second resource attribute. The processor, when executing the executable instructions, also predicts, for a time period, an expected number of incoming contacts requiring resources possessing one of the first resource attribute or the second resource attribute; identifies a correlation between the first resource attribute and the second resource attribute; and based on the correlation, forecasts a minimum number of resources from each of the first set of resources and the second set of resources to handle the expected number of incoming contacts at a predetermined service level for the time period. The minimum number of resources from the first set of resources is less than a number of resources required without the correlation.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein:

FIGS. 4A to 4D are flowcharts of exemplary methods for managing a plurality of resources in a contact center in accordance with one aspect of the present disclosure.

DETAILED DESCRIPTION

Figure 1:
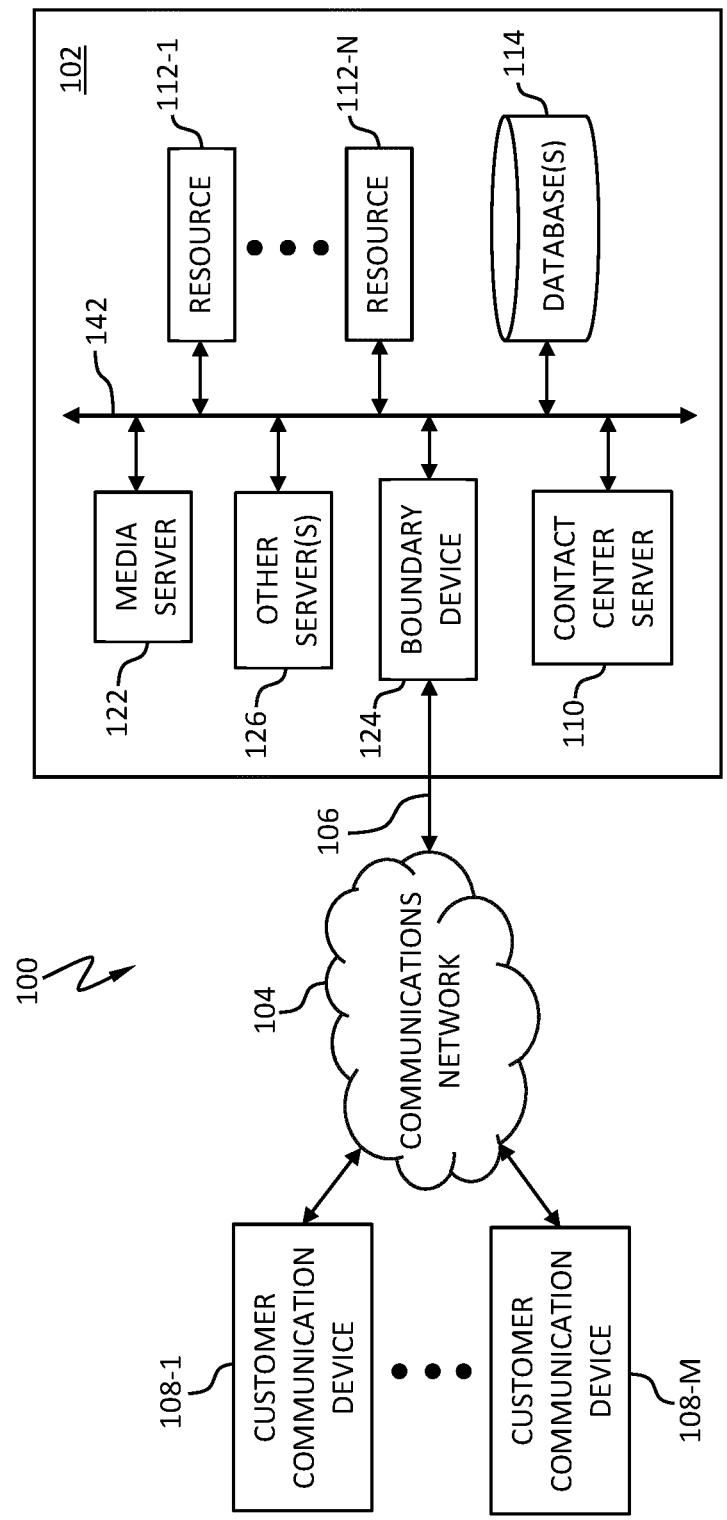
FIG. 1 illustrates a communications system architecture in accordance with the principles of the present disclosure.

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communications may be by way of any communications medium such as, but not limited to, a telephone call, email, instant message, web chat, and the like. The terms "user" and "customer" denote a party external to the contact center and are used herein to refer to the other party to a contact or a communications session. A user or customer may include, for example, a person having a commercial relationship with the contact center or with a business represented by the contact center.

For each contact received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure may be separately claimed.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

FIG. 1 shows an exemplary embodiment of a communications system 100 according to the present disclosure. The communications system 100 may comprise a communications network 104 connecting components of a contact center 102 via a communications link 106 to one or more customer communication devices 108-1 to 108-M, where M is an integer, M≥1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communication medium or collection of communication media and may use any type or of protocols to transport messages between endpoints. The communications network 104 may be packet-switched and/or circuit-switched and may include wired and/or wireless technologies.

The contact center 102 may comprise, for example, a boundary device 124, a central contact center server 110, a media server 122, one or more other servers 126, and a set of data stores or databases 114. The additional servers 126 may include, for example, an Interactive Response unit (IVR), a voice portal, a video call server, an email server, and the like. Some or all of the components of the contact center 102 may be interconnected by an internal network 142 such as a local area network (LAN) or WAN. One or more of the components of the contact center 102 may also be connected via one or more optional communications links (not shown) to one or more other components of the contact center 102.

Although depicted as separate servers and/or applications that are co-located with one another, it should be appreciated that such a configuration of components is not required. For example, some or all of the functions depicted in FIG. 1 may be co-hosted and/or co-resident on a single server and/or processor, e.g., the contact center server 110, and/or two or more of the contact center 102 components may be distributed and connected to one another over the communication network 104, with the communications between these components may be secured with tunneling protocols or a Virtual Private Network (VPN; not shown). In addition, although one central contact center server 110 is depicted in FIG. 1, two or more servers 110 may be provided in a single contact center 102 or across multiple separate LANs 142 owned and operated by a single enterprise, but separated by the communications network 154. Likewise, two or more media servers 122 may be provided in the contact center 102. In configurations where the contact center 102 includes two or more servers 110 and/or media servers 122, each server 110, 122 may comprise similar functionality, but may be provisioned for providing its features to only a subset of all contact center users.

A customer associated with a customer communication device 108 may utilize the device 108 to generate and transmit a communication, such as a telephone call, an email message, an instant message (IM), an SMS message, etc., over the communications network 104, which is received as a contact at the contact center 102. The contact may be received at the boundary device 124, which maintains a secure separation between the communication network 104 and the internal network 142 and facilitates communications between the customer communication device 108 and the contact center 102. The boundary device 124 may include the functionality of one or more of a switch, a computer-telephony integration (CTI) interface, a SIP gateway, a security gateway, a firewall, a router, or the like. A boundary device 124 comprising a SIP gateway may, for example, connect with one or more SIP trunks from the communications network 104 and split incoming aggregate SIP traffic into individual SIP sessions and aggregate the individual outbound SIP sessions. The boundary device 124 may be implemented as hardware such as via an adjunct processor (as shown) or as a chip in the contact center server 110 (not shown).

Following receipt at the contact center 102, a contact object is instantiated for each contact as described herein and the contact objects are distributed to a plurality of resources 112-1 to 112-N, wherein N is an integer, N≥1 (referred to collectively herein as resource 112). Each resource 112 represents a processing resource of the contact center 102 and may comprise completely automated resources (e.g., processors, servers, or the like), human resources utilizing communication devices (e.g., human agents utilizing a computer, telephone, laptop, etc.), or any other resource known to be used in a contact center 102. In some embodiments, contact objects may be assigned to the IVR (not separately labeled), a voice portal (not separately labeled), or other component of the contact center 102 for automated customer service processing prior to or simultaneous with assigning the contact object to a human resource (e.g., a contact center agent). For example, the voice portal and the IVR may work together to provide IVR services to the contacts.

Each resource 112 may be associated with a resource communication device (not shown), which may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communications device, and/or any other suitable communications device. These packet-switched devices may be SIP compatible. The resource communication device may also comprise circuit-switched devices that each correspond to one of a set of internal extensions and may include, for example, wired and wireless telephones, voice messaging and response units, traditional computer telephony adjuncts, and any other suitable communications device.

Figure 2:
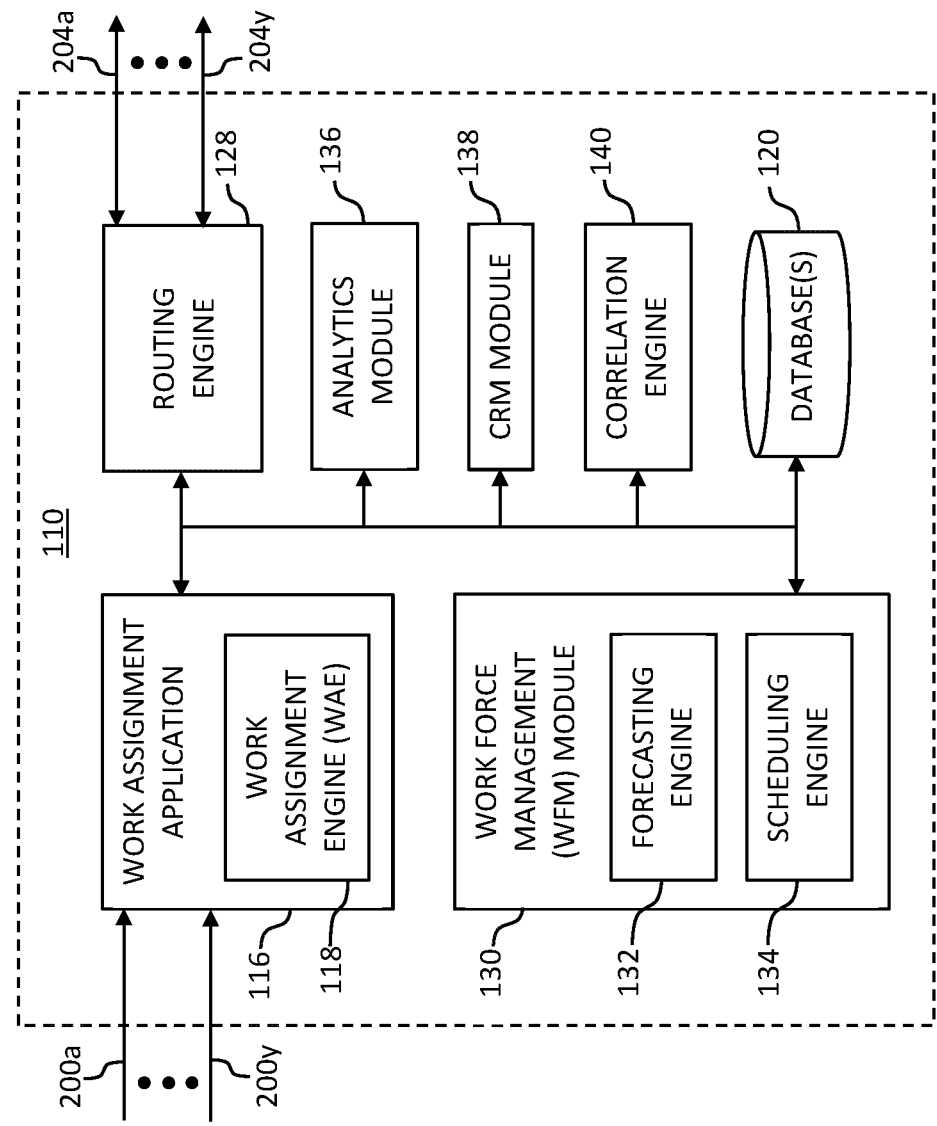
FIG. 2 illustrates aspects of a contact center server in accordance with principles of the present disclosure.

With reference to FIG. 2, the contact center server 110 may further comprise a work assignment application 116, a routing engine 128, a work force management (WFM) module 130, an analytics module 136, a customer relationship management (CRM) module 138, a correlation engine 140, and one or more database(s) 120. Although each of these functions is depicted in FIG. 2 as residing on the contact center server, it should be appreciated that one or more of the functions, such as the routing engine 128, may reside elsewhere and/or be executed by another server/engine.

Each contact object may comprise one or more work items and generally comprises at least a request for a resource 112. The format of each work item may depend upon the capabilities of the communication device 108 and the format of the communication. In particular, work items are logical representations within the contact center 102 of work to be performed in connection with servicing a particular contact received at the contact center 102 (and more specifically at the work assignment application 116). Work items may be received at the work assignment application 116 from the customer communication devices 108 via one or more customer communications lines or channels 200a to 200y (which may be one or more trunks, phone lines, etc.) and maintained at the work assignment application 116, a switch or server connected to the work assignment application 116, or the like until a resource 112 is assigned to the work item. The work assignment application 116 comprises a work assignment engine 118 that enables the work assignment application 116 to make intelligent routing decisions for work items. As used herein, assignment and/or routing of a contact or contact object to a resource and association of contact attributes with the contact or contact object are intended to be synonymous with assignment and/or routing of the work item(s) associated with the contact or contact object to a resource and association of contact attributes with the work item(s).

The work assignment engine 118 may determine which of the plurality of processing resources 112 is qualified and/or eligible to receive the work item and further determine which of the plurality of processing resources 112 is best suited to handle the processing needs of the work item. In situations of a work item surplus, the work assignment engine 118 may also determine an optimal assignment of a work item resource to a particular resource, e.g., resource 112-1. In some embodiments, the work assignment engine 118 may be configured to achieve true one-to-one matching by utilizing bitmaps/tables and other data structures. Following assignment of the resource 112-1 to a work item, the work assignment application 116 passes the work item to the routing engine 128 to connect the customer communication device 108 that initiated the communication with the assigned resource 112-1 via one of a plurality of resource communications lines 204a to 204y (which may be a voice-and-data transmission line such as a LAN 142 and/or a circuit switched voice line).

The WFM module 130 may be configured to manage the workforce of the contact center 102 (namely the human resources 112). The WFM module 130 may comprise a variety of functionalities, such as a forecasting engine 132 and a scheduling engine 134, that operate together to achieve optimal management of the workforce. The forecasting engine 132 may monitor current work item volume, current resource availability/utilization, past work item volume, past resource availability/utilization, estimated wait times, service levels, and other objectives and provides a forecast or estimate of the work item volume and required staffing levels in the contact center 102 for a desired shift period. For example, the forecasting engine 132 may be configured to monitor one or more Service Level Agreements (SLAs) between the contact center 102 and one or more clients or customers of the contact center 102 to ensure compliance with the applicable SLA(s).

The scheduling engine 134 uses the information provided by the forecasting engine to schedule human agents, e.g., resources 112, to work in the contact center 102. Additionally, the forecasting engine 132 may automatically identify future resource availability issues (in the short-term or long-term) and notify the scheduling engine 134, thereby enabling the scheduling engine 134 to adjust the scheduling of resources 112 as necessary. In some embodiments, the forecasting engine 132 is capable of analyzing prior and current contact center performance to determine if the contact center 102 will require more or less resources 112 at any particular time, e.g., the beginning or end of a calendar month. The scheduling engine 134 may also be configured to monitor schedule adherence, social media activity, and the like, and the WFM module 130 may enable shift bidding, schedule adjustments, work-at-home resource re-scheduling, and the like.

The analytics module 136 may be utilized to track trends and generate one or more reports that indicate agent performance and overall performance of the contact center 102. In some embodiments, the analytics module 136 may be configured to pull data stored in one or more databases 114, 120 and prepare the data in a human-readable format. The database(s) 114, 120 may be configured to store information about any or all components of the contact center 102 such as statistics related to the WFM module 130 (e.g., resource utilization, compliance with SLA agreements, compliance with objectives, etc.), resource performance statistics (e.g., Key Performance Indicators (KPIs)), and statistics related to the WAE 118 (e.g., decisions per time period, successful routing decisions, estimated wait time, etc.). Advantageously, the analytics module 136 may be configured to run one or more reports for predefined data automatically at predefined intervals. The analytics module 136 may also be enabled to run ad-hoc reports based on inputs received from a contact center administrator or manager. Further still, the analytics module 136 may be configured to run reports in response to a predetermined event or series of events occurring in the contact center 102.

The CRM module 138 may be configured to collect and manage historical customer information, current customer information, information related to interactions between a customer and a contact center 102, customer preferences, customer purchase history, customer return history, customer aliases (e.g., in social media networks), and the like. Such information may be stored and maintained in one or more of the database(s) 114, 120. The CRM module 138 may be utilized to help the contact center 102 provide a more robust and personalized customer service experience. In some embodiments, the CRM module 138 may retrieve desired CRM information from the database(s) 114, 120 to enable one of the resources 112 to more efficiently process a work item for a returning or known customer. For example, when a work item is received in a contact center 102 and the work item is associated with a customer having historical information stored as CRM information in one of the databases 114, 120, the CRM module 138 may retrieve some or all of the CRM information and provide the retrieved information to a resource 112, thereby enabling the resource 112 to provide a more personalized service to the customer.

Although some embodiments are discussed with reference to a client-server architecture, it is to be understood that the principles of the present disclosure apply to other network architectures. For example, the present disclosure applies to peer-to-peer networks, such as those envisioned by SIP. In the client-server model or paradigm, network services and the programs used by end users to access the services are described. The client side provides a user with an interface for requesting services from the network, and the server side is responsible for accepting user requests for services and providing the services transparent to the user. By contrast, in the peer-to-peer model or paradigm, each networked host runs both the client and server parts of an application program. Additionally, the disclosure does not require the presence of packet- or circuit-switched networks.

In some embodiments, the contact center server 110 and its various functionalities may be configured to administer and make work assignment decisions in a queueless contact center, as described in U.S. Pat. No. 8,634,543, the entire contents of which is hereby incorporated herein by reference.

In other embodiments, the server 110 may be configured to execute work assignment decisions in a traditional queue-based (or skill-based) contact center, as described in U.S. Pat. No. 8,234,141, the entire contents of which is hereby incorporated herein by reference. Skill-based contact centers may maintain a resource profile, which includes information related to each resource's skills, level(s) of skill expertise, and training, as well as metrics associated with a plurality of work items serviced by the resource for each resource skill (e.g., contact type, duration, and resolution, ratings from the customer and/or a supervisor, etc.). The resource profiles may be stored, for example, in one or more contact center database(s) (e.g., 114, 120 in FIGS. 1 and 2). This resource information is used to assign each resource to one or more skill groups or resource queues (not shown). When a new contact is received at a skill-based contact center, information about the contact is determined, such as the customer's identity and current needs, customer value, and the resource skill that is required for the proper handling of the contact, and this information, along with additional data such as current contact center queue lengths, is used to assign each new contact to a work item queue (not shown). Some of the information related to the contact may be maintained in a customer profile, which may also be stored, for example, in one or more contact center database(s) (e.g., 114, 120 in FIGS. 1 and 2). Contacts are assigned to resources based on a comparison of the resource skill required to service the contact and the skillset(s) of each resource.

In further embodiments, the server 110 and its various functionalities are configured to execute work assignment decisions in an attribute-based contact center, such as a contact center using the Avaya Oceana™ Solution. Similar to a skill-based contact center, attribute-based contact centers gather information about customers and assign each contact to a resource based on matching between customer and resource data. However, attribute-based matching provides a match based on a plurality of individual attributes of the contact and the resource, as opposed to matching based on a single "skill" assigned to the contact in a traditional skill-based setting. Attribute-based matching provides more details about the contacts and delivers a greater degree of granularity than traditional skill-based matching, which permits more accurate forecasting of future needs.

In an attribute-based contact center, a list of contact attributes is assigned to, or associated with, each incoming contact, in which the attributes describe the optimal resource for handling the contact. The contact attributes may include real-time or current information related to the present communication, such as a type of assistance required (sales, support, etc.), channel type (voice, email, etc.), a current customer mood or behavior (as identified using, for example, detection of certain keywords, repeated clicking or tapping, etc.), and the like. The contact attributes may also include historical or contextual data related to one or more previous communications with the customer, such as a preferred language, a preferred region for resource location, a customer priority, and the like. The contextual data may be combined from multiple communications channels and/or communications sessions and may be stored in the customer profile. Information related to the attributes of each resource (e.g., languages spoken, geographic location, personality type, etc.) may similarly be stored in a resource profile. The list of contact attributes is compared to the unique combination of attributes assigned to each resource, and the contact is routed to the most suitable resource based on a matching combination of attributes.

Matching based on individual attributes ensures that each incoming contact is assigned to the most suitable resource, thereby improving first call resolution. Attribute-based matching also allows the contact center to more accurately anticipate the volume and type of future incoming contacts and to forecast the required staffing levels. For example, the contact center may be able to accurately predict that a surge in a certain type of contact is expected during a certain portion of the workday, e.g., mid-morning through mid-afternoon. However, the practicality of scheduling resources to work in the contact center for half- or full-day shifts, e.g., 4 or 8 hours, may result in a work surplus at certain time points, in which customers must wait long periods of time for a matching resource to become available, and/or a resource surplus at certain time points, in which resources are idle and are awaiting assignment of a matching contact.

Systems and methods according to the present disclosure solve this problem by incorporating resource proficiency levels and identified relationships or correlations between two or more resource attributes when forecasting staffing needs and scheduling resources to work in the contact center during a particular time period. A resource's proficiency in a particular resource attribute indicates his or her level of skill and competence relative to other resources in the contact center with the same resource attribute. Resource attributes and proficiency levels offer the contact center the ability to differentiate between the resources working at the contact center and organize them according to their individual skills and abilities. In addition, each contact may specify a certain proficiency level or range for a particular resource attribute or collection of resource attributes, which may be used to determine the most suitable resource(s) to handle the contact. Using these correlations, a roster of resources with lower proficiency levels in one attribute may be complemented with resources having a higher proficiency level in the same attribute, thereby allowing a smaller pool of resources to handle incoming contacts while still achieving the required service level.

Each resource may be assigned a value or rating corresponding to a proficiency level in one or more resource attributes based on, for example, the amount of training completed by the resource related to the resource attribute, the resource's current position and the amount of time employed by the contact center, metrics related to customer satisfaction, first call resolution rate, and employer evaluations, and the like. For example, each resource may be assigned a number between 1 and 10 for a particular resource attribute, in which a value of "10" indicates a highly skilled and/or trained resource, e.g., an expert, while a value of "1" indicates a resource with little or no skills and/or training for the particular resource attribute. A value of "5" indicates a resource with an intermediate or moderate level of skill and/or training as compared to other resources with the same resource attribute. Resources may similarly be assigned to a category, such as "Expert," "Intermediate," or "Beginner," that is indicative of each resource's relative proficiency level. Each category may optionally include sub-categories or levels, e.g., "Expert, Levels 1-10." A lack of a level, rating, or category related to proficiency in a particular resource attribute may indicate that the resource has no proficiency in that attribute.

While contact centers typically offer a wide variety of services, there is often at least some degree of overlap in the knowledge, skills, etc. related to certain resource attributes. A correlation exists between two or more resource attributes when a proficiency in one resource attribute translates to at least some level of proficiency in another resource attribute. For example, a resource who is knowledgeable about one product offered by a company (i.e., the resource possesses a high level of proficiency with respect to the product) may also be knowledgeable about other products offered by the same company, such that there is a correlation between knowledge about the various products offered by the same company.

Resources may be organized into groups or sets based on the proficiency level of each resource for one or more resource attributes. For example, each resource may be assigned to one set of resources based on a minimum proficiency level in one resource attribute (e.g., a primary skill). Assignment to a particular set of resources may also factor in a correlation with another resource attribute (e.g., a secondary skill) and each resource's proficiency level in the secondary skill. For example, as described herein, a resource with a first proficiency level above a certain threshold for the primary skill may possess or be assigned a second proficiency level for the related, secondary skill. Each contact center or company may define how the correlation between resource attributes is defined and how to determine or assign the proficiency level in the secondary skill. A resource's proficiency level in one or more additional resource attributes may also be taken into consideration.

As one example, a first resource attribute may comprise knowledge about a first product, e.g., a smartphone, and a second resource attribute may comprise knowledge about a second product, e.g., a tablet. The smartphone and tablet may, for example, be produced by the same manufacturer and share a number of similarities, such as a common operating system, a similar user interface, etc. Thus, the contact center may identify a correlation between these two resource attributes, as a resource who is knowledgeable about the smartphone is also likely to possess at least some knowledge about the tablet. For example, a resource with a proficiency level of "8" for the smartphone may be assigned a proficiency level of "3" for the tablet. The resource may similarly be assigned a proficiency level of "2" for one or more additional resource attributes comprising knowledge about other devices that share similarities with the smartphone and/or tablet, e.g., smartwatches, desktop or laptop computers, etc. that are produced by the same manufacturer (see Example 1).

In other examples, the related resource attributes may comprise broader skills and competencies. For example, a resource who has worked for 15 years in support may have a proficiency level of "10" in support but may also be assigned a proficiency level of "2" in sales by virtue of his or her extensive knowledge about the products and/or services offered by the company. The resource attribute may also comprise a more general attribute, such as an attribute related to a resource's personality, character, temperament, and the like. For example, a customer calling with a complaint about a particular product or service may be assigned or transferred to a resource who has a lower proficiency level (e.g., "4") for the particular product or service but is highly skilled (e.g., "10") at handling certain types of contacts, e.g., customers with complaints, angry or frustrated customers, etc.

With reference to FIG. 2, the correlation engine 140 may operate in conjunction with the other functionalities of the contact center server 110 and the contact center 102, such as the WAE 118 and the WFM module 130, to identify correlations between resource attributes and accurately forecast the staffing needs of the contact center 102 to handle a predicted number of incoming contacts requiring a particular resource attribute or collection of resource attributes. In particular, identification of a correlation between two or more resource attributes by the correlation engine 140 allows the contact center 102 to reduce the total number of resources 112 required to handle a predicted number of incoming contacts, while still meeting applicable SLAs and metrics and maintaining the operation of the contact center 102 within specified parameters.

For example, using historical data such as past contact volume and type (e.g., contacts requiring resources with one or more particular resource attributes), past resource availability/utilization, and the like, the forecasting engine 132 predicts that a certain number of incoming contacts requiring resources with a particular resource attribute or collection of resource attributes is expected to be received during a particular time period. In one particular example, the time period may comprise, for example, one shift at the contact center 102 (e.g., a four-hour or eight-hour shift). In other embodiments, the time period may comprise one work week at the contact center 102 (e.g., forty hours), two work weeks, one month, etc.

Due to the increased level of detail offered by attribute-based matching, the forecasting engine 132 may also be able to use this historical data to predict that demand for resources with certain resource attributes is likely to fluctuate during the time period. The forecasting engine 132 may also take into consideration known future events, such as the release of a new product or service or the announcement of a product recall, in predicting an expected number of incoming contacts and the required resource attribute(s). The forecasting engine 132 may further take into consideration any applicable SLAs and other contact center metrics that must be met or maintained during the time period. Based on all of this information, the forecasting engine 132 forecasts the number of resources required to service the predicted number of incoming contacts at a particular service level and passes this forecast to the scheduling engine 134. The scheduling engine 134 may organize the resources into, for example, a first set of resources possessing the first resource attribute, a second set of resources possessing the second resource attribute, a third set of resources possessing a third resource attribute, etc. The scheduling engine 134 may then schedule resources from each of sets of resources to work in the contact center 102 during the time period.

In one example, the forecasting engine 132 may predict that a number of incoming contacts requiring resources with a first or second resource attribute for a particular time period (e.g., one four-hour shift) is expected to fluctuate during the time period. The forecasting engine 132 may forecast, for example, that 100 resources with the first resource attribute will be required during an earlier portion of the time period to handle the expected number of incoming contacts requiring resources with the first resource attribute at a particular service level. However, a predicted surge in demand during a later portion of the time period will require 500 resources with the first resource attribute to maintain the service level. The forecasting engine 132 may also forecast that the required number of resources with the second resource attribute will be higher during the earlier portion of the time period, e.g., 500 resources, but demand is expected to decrease during the later portion of the time period such that only 300 of these resources will be required.

Thus, without any correlation between the first and second resource attributes, a forecasted total of 1,000 resources is needed to handle the expected number of incoming contacts for the entire time period.

However, this forecasted total number of resources may not be feasible for a number of reasons. For example, it may exceed the capacity and/or budget of the contact center 102 and may also result in a significant resource surplus during one or more portions of the time period. While the forecasting engine 132 is able to accurately predict the changes in resource demand, it is likely not practical for the scheduling engine 134 to dynamically increase the number of resources with the first resource attribute in the middle of the time period to align the number of available resources with the predicted increase in demand. In the absence of any correlation between the first and second resource attributes, the contact center 102 would likely be forced to make compromises when scheduling resources.

For example, the contact center 102 could choose between scheduling the number of resources with the first resource attribute to meet the demand during either: (1) the expected surge during the later portion of the time period; or (2) the expected lower demand during the earlier portion of the time period. If the contact center 102 chooses the first option, there will be a sufficient number of resources with the first resource attribute to handle the expected surge, but a significant number of these resources will be idle during the earlier portion of the time period. If the contact center 102 chooses the second option, fewer of the resources with the first attribute will be idle during the earlier, lower demand portion of the time period, but during the expected surge, customers may experience longer wait periods, call abandonment rates may spike, etc. The contact center 102 would have to make a similar compromise in scheduling the resources with the second attribute. The contact center 102 could also choose to reduce the overall number of agents, which would likely result in longer waiting periods, increased abandonment rates, etc. throughout various portions of the time period for both types of contacts. Regardless of how the contact center 102 chooses to proceed, when demand for each resource attribute is considered in isolation, the contact center performance metrics will likely be negatively impacted and the service level may not be met for at least some portion of the time period due to lengthy waiting times, high call abandonment rates, decreased customer satisfaction, etc.

In accordance with the present disclosure, the correlation engine 140 identifies a correlation between the first and second resource attributes and provides information regarding the correlation to the forecasting engine 132, which uses the correlation to determine when resources possessing one resource attribute may complement resources possessing another, related resource attribute. As described herein, a resource who is highly skilled in one resource attribute may also possess a certain level of skill in another, related resource attribute, such that this resource may also be able to handle contacts requiring a resource with the other, related resource attribute. In the previous example in which fluctuations in demand for certain resources are expected during the time period, the forecasting engine 132 may use information received from the correlation engine 140 to determine that the resources with the second resource attribute could also handle some of the expected surge of contacts requiring resources with the first resource attribute, provided that the resources with the second resource attribute have access to internal support from the resources possessing the first resource attribute.

As a result, the forecasting engine 132 may determine that 500 resources with the second resource attribute and only 300 resources with the first resource attribute are needed to handle the expected number of incoming contacts at the service level for the entire time period. Thus, when a correlation between the first and second resource attributes is taken into consideration, only 800 total resources are needed, as opposed to 1,000, for a total reduction of 200 resources. This reduction may also be realized in the inverse situation, e.g., when the required number of resources with the first resource attribute decreases during a later portion of the time period (e.g., a decrease from 100 to 50), but the required number of resources with the second resource attribute increases during the later portion (e.g., an increase from 300 to 600). When a correlation between the first and second resource attributes is taken into consideration, the forecasting engine 132 may determine in this latter situation that a total of only 650 resources (as opposed to 700 total resources without the correlation) could handle all of the expected incoming contacts at the required service level for the entire time period. It should be appreciated that the systems and methods according to the present disclosure may also be used to forecast the required minimum number of resources when multiple fluctuations in demand are expected for each type of resource within the same time period.

Figure 3:
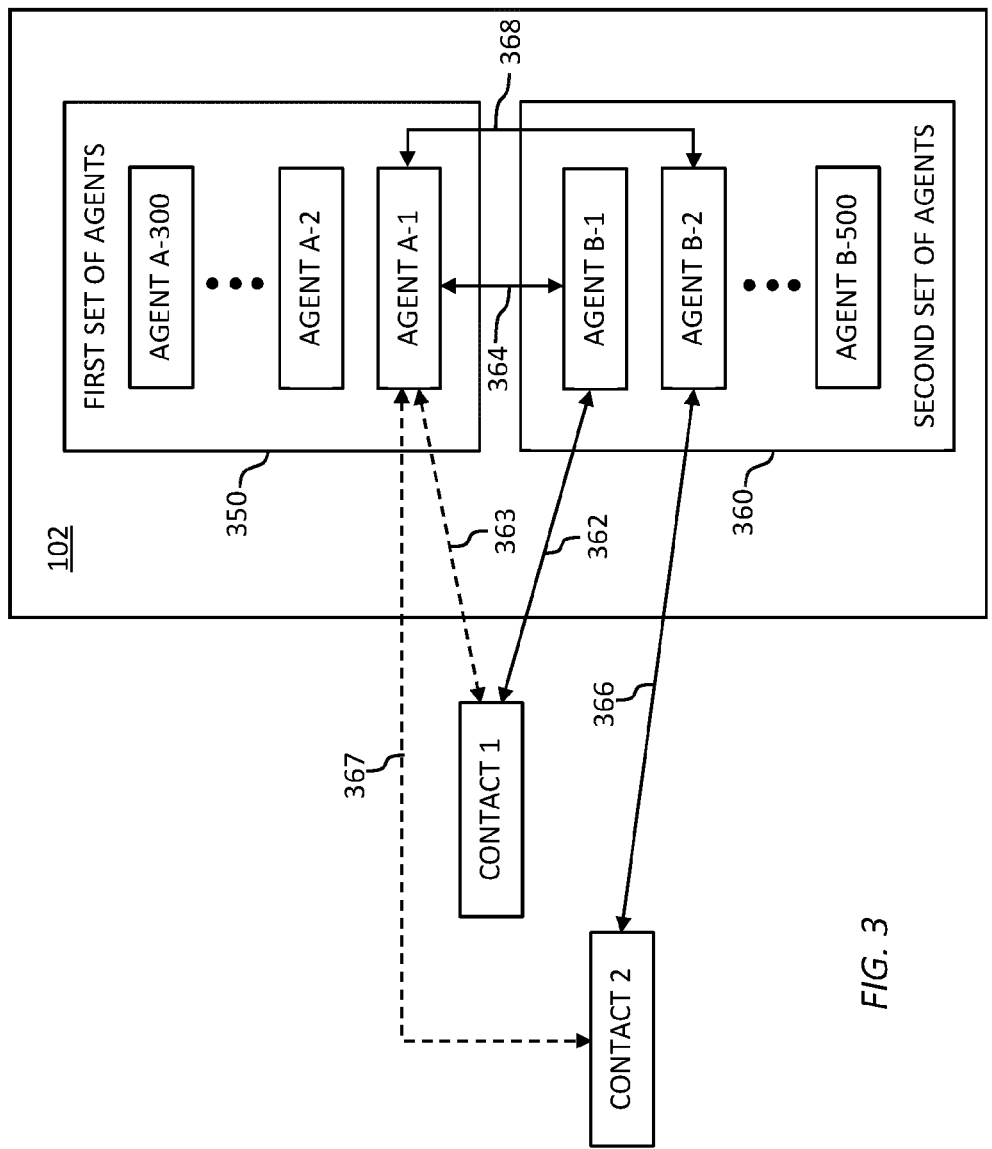
FIG. 3 illustrates one particular aspect of a contact center server in accordance with principles of the present disclosure.

Continuing with this example, FIG. 3 is a block diagram illustrating exemplary internal communication between sets of resources with complementary resource attributes. A plurality of resources, Agents A-1 to A-300, are assigned to a first set of resources 350, and a plurality of resources, Agents B-1 to B-500, are assigned to a second set of resources 360. In some embodiments, Agents A-1 to A-300 each comprise a proficiency level above a first threshold for the first resource attribute, e.g., a proficiency level of "5" or higher or assignment to a category of at least "Intermediate." Agents B-1 to B-500 each similarly comprise a proficiency level above a second threshold for the second resource attribute, e.g., a proficiency level of "5" or higher or assignment to a category of at least "Intermediate." Agents B-1 to B-500 may also each comprise at least some level of proficiency for the first resource attribute, but the proficiency level for the first resource attribute is below the first threshold, e.g., a proficiency level between "1" and "4" or assignment to the "Beginner" category. For the purposes of the example depicted in FIG. 3, the first resource attribute comprises knowledge about a first product, and the second resource attribute comprises knowledge about a second, related product.

A new contact, Contact 1, is received by the contact center 102 as described herein and specifies a requirement for a resource with the first resource attribute. Contact 1 is assigned to a resource, Agent B-1, from the second set of resources 360, and a communication session 362 is established between Contact 1 and Agent B-1. A second new contact, Contact 2, has also requested a resource with the first resource attribute. Contact 2 is assigned to Agent B-2 from the second set of resources 360, and a communication session 366 is established between Contact 2 and Agent B-2.

In the past, the routing engine 132 would have automatically assigned Contact 1 and Contact 2 to resources from the first set 350 because of the specified requirement for a resource with the first resource attribute. Thus, if all of the resources in the first set 350 were busy, e.g., during the expected surge, Contact 1 and Contact 2 would be required to wait until a resource from the first set 350 became available. However, because of the identified correlation between the first and second resource attributes, Contact 1 and Contact 2 are each assigned to resources in the second set of resources 360 who also possess at least some level of proficiency for the first product.

For example, Agent B-1 has a proficiency level of "8" for the second product, and based on this high degree of knowledge for the second product, Agent B-1 also has a proficiency level of "3" for the first product. Agent B-1 may be able to answer all of Contact 1's questions about the first product, and the communication session 362 may conclude successfully. However, Contact 1 may ask Agent B-1 a question about the first product that Agent B-1 is unable to answer. Agent B-1 may then initiate an internal communication session 364 with a resource, Agent A-1, from the first set of resources 350 who is highly skilled with respect to the first product, e.g., a proficiency level of "10". The communication session 364 may comprise, for example, a chat session, a phone call, an email, etc. Agent B-1 forwards the question from Contact 1 to Agent A-1, and Agent A-1 provides an answer to Agent B-1, who passes along the answer to Contact 1. A communication session 363 may optionally be established directly between Agent A-1 and Contact 1.

Agent B-2 similarly has a proficiency level of "7" for the second product, and a proficiency level of "2" for the first product. If Contact 2 asks Agent B-2 a question about the first product that Agent B-2 is unable to answer, Agent B-2 may initiate an internal communication session 368 with Agent A-1 and forward the question from Contact 2. Agent A-1 provides an answer to Agent B-2, who provides the answer to Contact 2. A communication session 367 may optionally be established directly between Agent A-1 and Contact 2.

The communication session 368 between Agent B-2 and Agent A-1 may be established before, during, or after the establishment or conclusion of the communication session 364 between Agent B-1 and Agent A-1. In this manner, Agents B-1 and Agents B-2, who possess some degree of knowledge about the first product, may handle contacts with questions about both the first and second products and may seek additional assistance, if needed, from one resource in the first set of resources 350, e.g., Agent A-1, who is highly knowledgeable about the first product. Agent A-1 may also be simultaneously communicating internally with one or more additional resources assigned to the second set of resources 360 and may also be handling one or more contacts (not shown) that were directly assigned to Agent A-1. Other resources from the first set of resources 350, e.g., Agent A-2, may each be conducting simultaneous internal communications with one or more resources assigned to the second set of resources 360 and/or handling one or more directly assigned contacts (not shown). Using the correlation between the first and second resource attributes and the ability of one resource from the first set 350 to simultaneously handle multiple, internal communications from resources in the second set 360, the forecasting and scheduling engines 132, 134 may minimize the overall required number of resources from both sets of resources 350, 360, while still maintaining an acceptable service level in the contact center 102.

With continued reference to FIG. 3, in some embodiments, the routing engine 128 may make assignment and routing decisions based on a current time, the predicted demand for each type of resource throughout the time period (as provided by the forecasting engine 132), and other information, such as current agent occupancy. As described herein, the forecasting engine 132 may predict that the number of contacts requiring resources with a first resource attribute will increase during the middle portion of the time period. If a contact requiring the first resource attribute is received outside of the predicted period of high demand, e.g., at the beginning or end of the time period, the routing engine 132 may assign the contact to a resource in the first set 350. However, if this contact is received during the predicted surge of contacts requiring the first resource attribute, the routing engine 132 may assign the contact to Agent B-1, even if a resource in the first set 350 is available or will become available within an acceptable amount of time. This selective assignment of contacts may help to ensure that a sufficient number of resources in the (smaller) first set 350 who are highly skilled with respect to the first product remain available during periods of high demand to provide assistance to the resources in the (larger) second set 360 who are less skilled with respect to the first product.

FIGS. 4A-4D, 5A, and 5B illustrate exemplary methods in accordance with the present disclosure for forecasting a minimum number of resources required to handle a predicted number of incoming contacts. These methods may be performed all or in part by a server of a contact center 102, e.g., central server 110, executing instructions stored in one or more memory devices.

FIGS. 4A to 4D are flowcharts illustrating an exemplary method for managing a plurality of resources in a contact center in accordance with the present disclosure. The method begins at Step 402 in which each resource is assigned to one of a first set of resources and a second set of resources. The resources assigned to the first set of resources each comprise a proficiency level above a first threshold for a first resource attribute. The resources assigned to the second set of resources comprise a proficiency level below the first threshold for the first resource attribute and a proficiency level above a second threshold for the second resource attribute. At Step 404, an expected number of incoming contacts requiring resources possessing one of the first resource attribute or the second resource attribute is predicted for a time period. At Step 406, a correlation between the first and second resource attributes is identified. Based on the correlation, a minimum number of resources from each of the first set of resources and the second set of resources that are required to handle the expected number of incoming contacts at a predetermined service level for the time period is forecasted at Step 408, and at Step 410, the forecasted minimum number of resources are scheduled to work in the contact center during the time period. In some embodiments, the first resource attribute may comprise knowledge about a first product or service, while the second resource attribute may comprise knowledge about a second product or service.

As described herein, when the number of resources required for optimal handling of contacts requiring resources with one of the first or second resource attribute is considered in isolation (i.e., without a correlation between the resource attributes), the contact center may be forced to make compromises when determining how many resources are needed. In contrast, when a correlation between the first and second resource attributes is identified, the skills of the resources from one set may be used to complement the skills of the resources from the other set. Because the resources from the second set also have at least some level of proficiency in the first resource attribute, some of these resources may be assigned to handle the later, predicted surge of contacts requiring resources with the first resource attribute.

In one embodiment shown in FIG. 4B, the method may continue at Step 412, in which a first communication session is established between one resource from a second set of resources and a new contact requiring a resource with the first resource attribute. At Step 414, a second communication session may be established between the one resource and at least one resource from the first set of resources during the communication session, after which the method may end. In some particular embodiments, the second communication session may be established following a request by the one resource (e.g., initiating a chat session or phone call, sending an email, etc.). In other particular embodiments (not shown), a supervisor within the contact center may be monitoring the first communication session between the resource and the new contact, and the supervisor may initiate establishment of the second communication session if the content of the first communication session indicates that the resource is struggling to answer questions, the customer is getting frustrated or angry, etc. In further particular embodiments (not shown), the second communication may be established automatically by the contact center 102, for example, following detection of certain keywords in the first communication session (e.g., "You have not answered my question").

In another embodiment, one or more of the resources assigned to the second set of resources also comprise a proficiency level below a third threshold for at least one additional resource attribute, and the method may continue at Step 416 shown in FIG. 4C, in which an expected number of incoming contacts requiring resources possessing the at least one additional resource attribute is predicted for the time period. At Step 418, a second correlation between the first resource attribute and the at least one additional resource attribute is identified. For example, the at least one additional resource attribute may comprise knowledge about a third product or service that is related to the first product or service. Based on the first and second correlations, the minimum number of resources from each of the first set and the second set required to handle the expected number of incoming contacts at the predetermined service level for the time period is forecasted at Step 420, after which the method may end. As previously described with respect to the correlation between the first and second resource attributes, the minimum number of resources from the first set is less than a number of resources required without factoring in the first and second correlations. It should be appreciated that there may be one or more additional correlations between the additional resource attributes and the second resource attribute and/or other resource attributes and further that resources with proficiency level(s) in the one or more additional resource attributes may be assigned to a third, fourth, etc. set of resources.

Figure 4A:
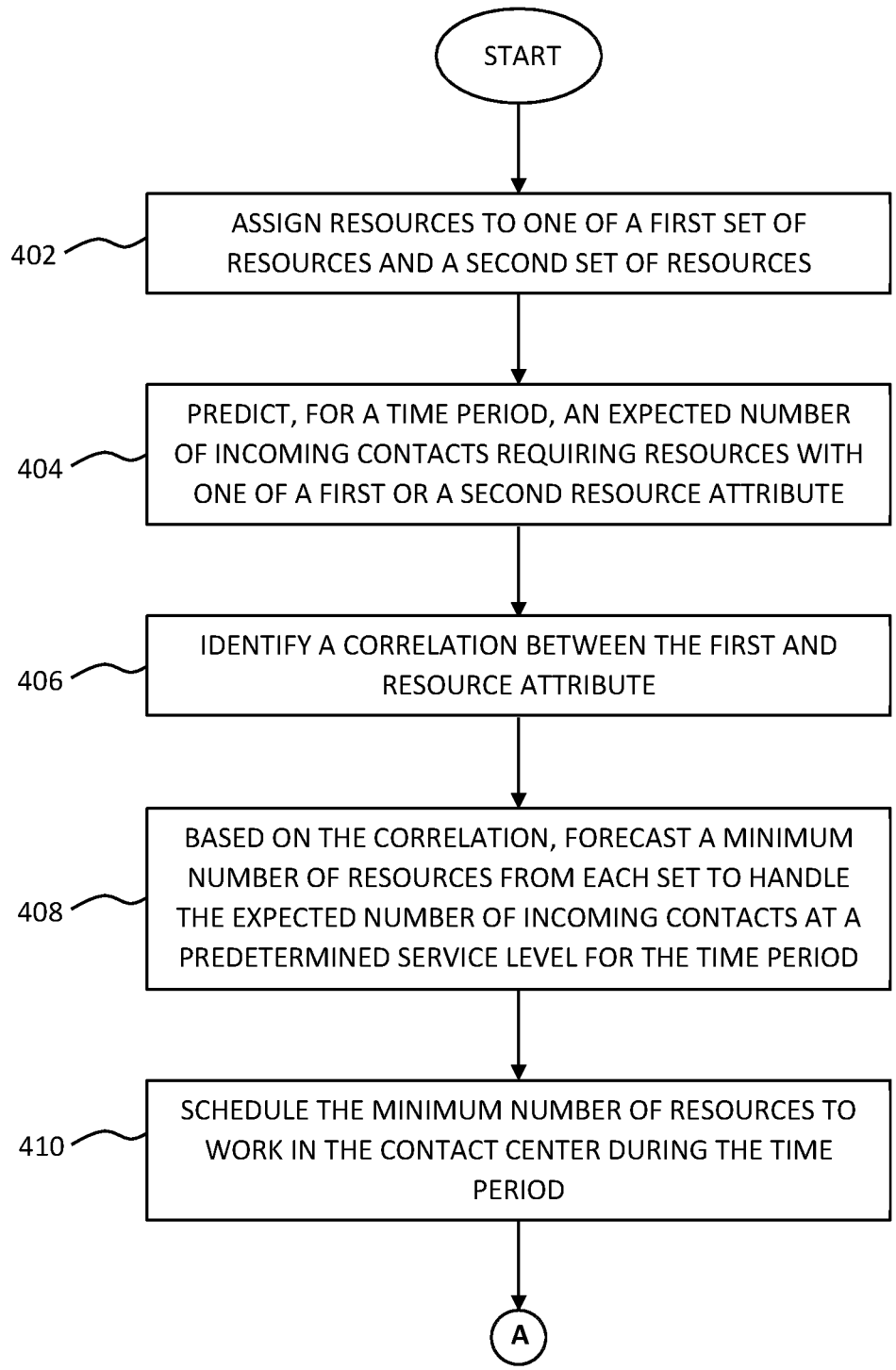
Figure 4D:
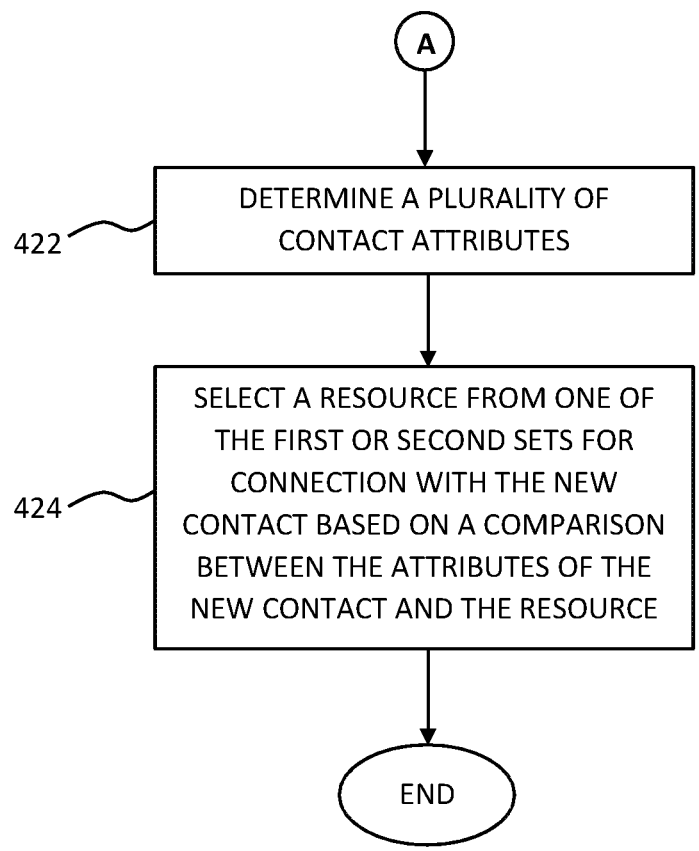

In a further embodiment shown in FIG. 4D, the method may continue at Step 422, in which each resource further comprises a plurality of additional resource attributes (in addition to the first or second resource attributes) and a plurality of contact attributes are determined for a new contact. At Step 424, a resource is selected from one of the first set of resources or the second set of resources for connection with the new contact, after which the method may end. The selection of the resource is based on a comparison between the plurality of additional resource attributes and the plurality of contact attributes. For example, the contact may request a resource with the first resource attribute and may also wish to communicate with a resource located in a specified region and in a particular language. The attributes of available resources are compared to the contact attributes and the most suitable resource is selected.

Figure 5A:
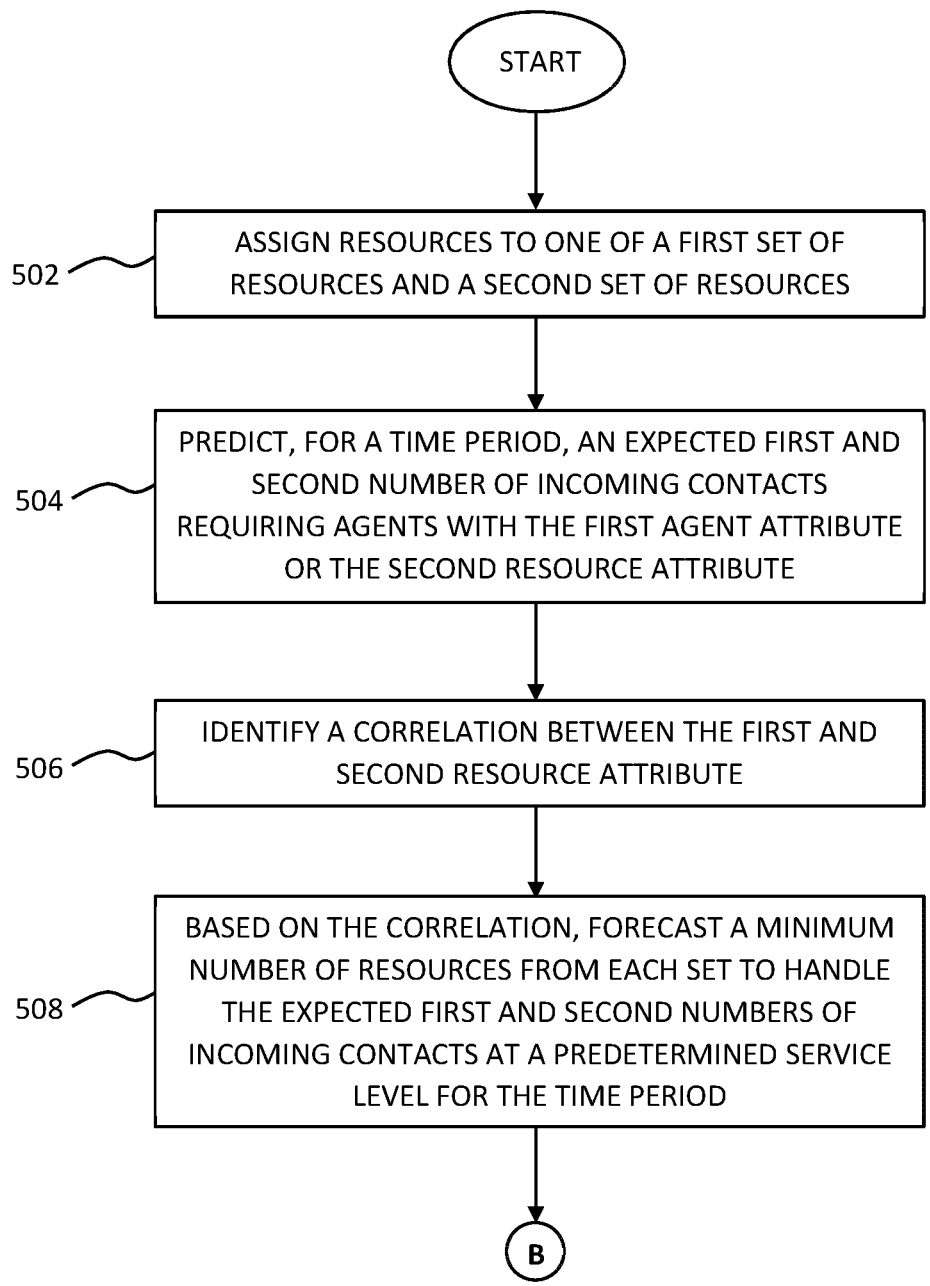
FIGS. 5A and 5B are flowcharts of exemplary methods for managing a plurality of resources in a contact center in accordance with another aspect of the present disclosure.
Figure 5B:
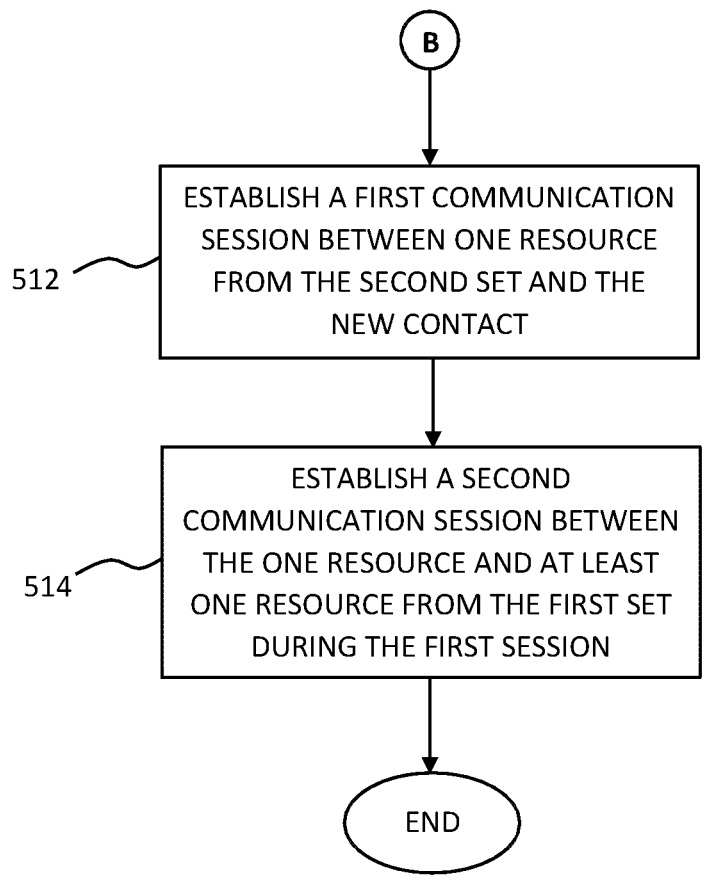

FIGS. 5A and 5B are flowcharts illustrating another exemplary method for managing a plurality of resources in a contact center in accordance with the present disclosure. In FIG. 5A, the method begins at Step 502 in which each resource is assigned to one of a first set of resources or a second set of resources. The resources assigned to the first set each comprise a proficiency level above a first threshold for a first resource attribute. The resources assigned to the second set comprise a proficiency level below the first threshold for the first resource attribute and a proficiency level above a second threshold for the second resource attribute. At Step 504, an expected first number of incoming contacts requiring resources possessing the first resource attribute and an expected second number of incoming contacts requiring resources possessing the second resource attribute are each predicted for a time period. At Step 506, a correlation between the first and second resource attributes is identified. Based on the correlation, a minimum number of resources from each of the first and the second sets of resources that are required to handle the expected first and second numbers of incoming contacts at the predetermined service level for the time period is forecasted at Step 508, after which the method may conclude. As described herein, without the correlation identified at Step 506, the expected first number of incoming contacts would have historically resulted in scheduling of a first (higher) number of resources from the first set to handle these contacts at a predetermined service level for the time period. With the correlation, the minimum number of resources from the first set is less than the historically required number of resources.

In some particular embodiments, the correlation between the first and second resources attributes may also result in a reduction of the minimum number of resources required from the second set. Without the correlation, the expected second number of incoming contacts requiring resources with the second resource attribute would have historically resulted in scheduling of a second (higher) number of resources from the second set to handle these contacts at the predetermined service level for the time period. However, with the correlation, the minimum number of resources required from the second set is less than the second (historical) number of resources. For example, the resources in the first set may possess at least some level of proficiency in the second resource attribute such that the resources in the first set may be able to handle some incoming contacts requiring a resource with the second resource attribute, thereby reducing the number of resources required from the second set.

In one embodiment shown in FIG. 5B, the method may continue at Step 512, in which a first communication session is established between one resource from second set of resources and a new contact requiring a resource with the first resource attribute. At Step 514, a second communication session may be established between the one resource and at least one resource from the first set of resources during the communication session, after which the method may end.

The presently disclosed system and method may be more fully understood by way of the following examples.

Example 1

An attribute-based contact center 102 includes a pool of agents that provide support for multiple electronic devices that are manufactured by one company. Some of the agents are highly skilled and have received extensive training with respect to a smartphone that is manufactured by the company (also referred to in this Example as "a first agent attribute"). Other agents in the contact center 102 are highly skilled and have received extensive training with respect to a tablet that is manufactured by the same company (also referred to as "a second agent attribute"). The smartphone and tablet were developed around a common operating system and share a number of similarities. For example, the devices use a similar user interface and hardware, and users may download common application programs to the devices. Thus, an agent who is knowledgeable about one device also possesses at least some degree of skill and knowledge (e.g., a proficiency level of at least "1") with respect to the other device.

Based on this overlap in knowledge and skills, the contact center 102 may organize agents by assigning them to groups or sets based on their proficiency level with respect to each resource attribute. For example, agents assigned to a first set of agents possess a proficiency level above a threshold in the first agent attribute (e.g., "5" or above, "Intermediate" category or higher, etc.) and a proficiency level below a threshold for the second agent attribute (e.g., "4" or below or "Beginner" category). Agents possessing a proficiency level above a threshold in the second agent attribute (e.g., "5" or above, "Intermediate" category or higher, etc.) and a proficiency level below a threshold for the first agent attribute (e.g., "4" or below or "Beginner" category) are assigned to a second set of agents.

For a particular four-hour shift, e.g., 8:00 am to 12:00 pm, the forecasting engine 132 of the contact center 102 predicts that 100 agents with the first attribute will be required early in the morning, e.g., from 8:00 to 10:00 am, to handle the expected number of incoming contacts requiring this type of agent at a predetermined service level. The forecasting engine 132 predicts that demand for agents with the second attribute will be highest during the early morning period and that 500 agents from the second set are needed to handle these contacts at the service level. The demand for agents with the second attribute is then expected to decrease later in the morning, such that only 300 of these agents are needed from 10:00 am to 12:00 pm. The company is announcing a new smartphone at 10:00 am on that day, and, based on data related to past new product releases, the forecasting engine 132 forecasts a significant increase in the number of contacts related to the new smartphone following the announcement. Accordingly, the forecasting engine 132 forecasts that 500 agents from the first set would be needed from 10:00 am to 12:00 pm to handle the increased number of contacts requiring agents with the first agent attribute.

As described herein, while the forecasting engine 132 is able to accurately predict changes in contact volume and type, it is generally not practical for the scheduling engine 134 to dynamically increase the number of agents with the first agent attribute, e.g., from 100 to 500 agents, to align with the predicted surge in contacts from 10:00 am to 12:00 pm, as agents are typically scheduled to work in the contact center 102 for a minimum of a four-hour shift. In the absence of any correlation between the first and second agent attributes, the total predicted number of agents required to handle the expected incoming contacts at the service level would be 1,000, and the contact center 102 would be forced to make compromises in scheduling agents to meet the fluctuating demands during the shift.

However, the forecasting engine 132 in accordance with the present disclosure utilizes an identified correlation between agent attributes related to the smartphone and the tablet in formulating the forecast. For example, the forecasting engine 132 may forecast that only 300 agents with the first agent attribute and 500 agents with the second attribute would be able to handle the demand for agents with both types of attributes throughout the entire shift, provided that the agents with the second attribute are able to seek additional support from agents with the first attribute. Based on their extensive knowledge about the tablet, agents from the second set would likely be able to successfully handle many of the contacts related to the smartphone. If a contact with questions about the smartphone cannot be successfully resolved by an agent from the second set, the agent would be able to internally consult with agents from the first set. One agent from the first set would be able to handle multiple chat sessions, emails, phone calls, etc. from agents in the second set who are seeking assistance. Using the correlation between the first and second agent attributes and the ability of one agent from the first set to simultaneously handle multiple internal communications from agents in the second set, the forecasting and scheduling engines 132, 134 can minimize the overall required number of agents (e.g., 800 as opposed to 1,000), while still maintaining an acceptable service level in the contact center 102.

This Example may also be extended to correlations between one or more additional attributes. For example, there may be a correlation between the first agent attribute, i.e., knowledge related to the smartphone, and a third agent attribute comprising knowledge about a laptop or desktop computer manufactured by the same company, a fourth agent attribute comprising knowledge about an electronic reader manufactured by the same company etc. The total number of agents needed to handle an expected number of incoming contacts related to the first and third or fourth agent attribute may be minimized in the same fashion using the correlation between the agent attributes and complementing of agents with lower proficiency levels in one of the agent attributes with resources having a higher proficiency level in the same agent attribute(s).

Example 2

In another example, the first agent attribute may comprise knowledge about a first vehicle type or model, e.g., a sedan, and the second agent attribute may comprise knowledge of a second vehicle type or model, e.g., a sport utility vehicle (SUV) made by the same manufacturer. The sedan and SUV may share similar engine structures, electronics, interior design and features, etc. Similar to Example 1, an agent who is knowledgeable about the sedan may also possess a certain amount of knowledge about the SUV, and vice versa. The resource may also possess knowledge about other types or models of vehicles made by the same manufacturer.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method for managing a plurality of resources in a contact center, comprising:
   assigning, by a contact center processor, each resource to one of:
   a first set of resources each comprising a proficiency level above a first threshold for a first resource attribute, or
   a second set of resources each comprising a proficiency level below the first threshold for the first resource attribute and a proficiency level above a second threshold for a second resource attribute;
   predicting, by the contact center processor, for a time period, an expected number of incoming contacts requiring resources possessing one of the first resource attribute or the second resource attribute;
   identifying, by the contact center processor, a correlation between the first resource attribute and the second resource attribute; and
   based on the correlation, forecasting, by the contact center processor, a minimum number of resources from each of the first set of resources and the second set of resources to handle the expected number of incoming contacts at a predetermined service level for the time period, wherein the minimum number of resources from the first set of resources is less than a number of resources required without the correlation.

2. The method of claim 1, further comprising:
   scheduling, by the contact center processor, the minimum number of resources to work in the contact center during the time period.

3. The method of claim 1, wherein the first resource attribute comprises knowledge about a first product and the second resource attribute comprises knowledge about a second product.

4. The method of claim 1, further comprising, for a new contact requiring a resource with the first resource attribute:
   establishing, by the contact center processor, a first communication session between the new contact and one resource from the second set of resources; and
   establishing, by the contact center processor, a second communication session between the one resource and at least one resource from the first set of resources during the first communication session.

5. The method of claim 4, wherein the second communication session is established following a request by the one resource.

6. The method of claim 1, wherein one or more of the resources assigned to the second set of resources comprises a proficiency level below a third threshold for at least one additional resource attribute, the method further comprising:
   predicting, by the contact center processor, for the time period, an expected number of incoming contacts requiring resources possessing the at least one additional resource attribute;
   identifying, by the contact center processor, a second correlation between the first resource attribute and the at least one additional resource attribute; and
   based on the first and second correlations, forecasting, by the contact center processor, a second minimum number of resources from each of the first set of resources and the second set of resources to handle the expected number of incoming contacts at the predetermined service level for the time period, wherein the second minimum number of resources from the first set is less than a number of resources required without the first and second correlations.

7. The method of claim 1, wherein each resource further comprises a plurality of additional resource attributes, the method further comprising:
   determining, by the contact center processor, for a new contact, a plurality of contact attributes; and selecting, by the contact center processor, a resource from one of the first set of resources or the second set of resources for connection with the new contact, the selection being based at least in part on a comparison between the plurality of additional resource attributes and the plurality of contact attributes.

8. A method for managing a plurality of resources in a contact center, comprising:
assigning, by a contact center processor, each resource to one of:
a first set of resources each comprising a proficiency level above a first threshold for a first resource attribute, or
a second set of resources each comprising a proficiency level below the first threshold for the first resource attribute and a proficiency level above a second threshold for a second resource attribute;
predicting, by the contact center processor, for a time period:
an expected first number of incoming contacts requiring resources possessing the first resource attribute, the expected first number of incoming contacts historically resulting in scheduling of a first number of resources from the first set of resources to handle the expected first number of incoming contacts at a predetermined service level for the time period; and
an expected second number of incoming contacts requiring resources possessing the second resource attribute;
identifying, by the contact center processor, a correlation between the first resource attribute and the second resource attribute; and
based on the correlation, forecasting, by the contact center processor, a minimum number of resources from each of the first set of resources and the second set of resources to handle the expected first and second numbers of incoming contacts at the predetermined service level for the time period, wherein the minimum number of resources from the first set of resources is less than the first number of resources.

9. The method of claim 8, wherein the minimum number of resources from the second set of resources is less than a second number of resources from the second set of resources historically scheduled to handle the expected second number of incoming contacts at the predetermined service level for the time period.

10. The method of claim 8 further comprising, for a new contact requiring a resource with the first resource attribute:
establishing, by the contact center processor, a first communication session between the new contact and one resource from the second set of resources; and
establishing, by the contact center processor, a second communication session between the one resource and at least one resource from the first set of resources during the first communication session.

11. The method of claim 10, wherein the second communication session is established following a request by the one resource.

12. The method of claim 8, wherein each resource further comprises a plurality of additional resource attributes, the method further comprising:
determining, by the contact center processor, for a new contact, a plurality of contact attributes; and
selecting, by the contact center processor, a resource from one of the first set of resources or the second set of resources for connection with the new contact, the selection being based at least in part on a comparison between the plurality of additional resource attributes and the plurality of contact attributes.

13. A system for managing a plurality of resources in a contact center, comprising:
a memory device, storing executable instructions;
a processor in communication with the memory device, wherein the processor when executing the executable instructions:
assigns each resource to one of: (i) a first set of resources each comprising a proficiency level above a first threshold for a first resource attribute; or (ii) a second set of resources each comprising a proficiency level below the first threshold for the first resource attribute and a proficiency level above a second threshold for a second resource attribute;
predicts, for a time period, an expected number of incoming contacts requiring resources possessing one of the first resource attribute or the second resource attribute;
identifies a correlation between the first resource attribute and the second resource attribute; and
based on the correlation, forecasts a minimum number of resources from each of the first set of resources and the second set of resources to handle the expected number of incoming contacts at a predetermined service level for the time period, wherein the minimum number of resources from the first set of resources is less than a number of resources required without the correlation.

14. The system of claim 13, wherein the processor when executing the executable instructions:
schedules the minimum number of resources to work in the contact center during the time period.

15. The system of claim 13, wherein the processor when executing the executable instructions, for a new contact requiring a resource with the first resource attribute:
establishes a first communication session between the new contact and one resource from the second set of resources; and
establishes a second communication session between the one resource and at least one resource from the first set of resources during the first communication session.

16. The system of claim 15, wherein the second communication session is established following a request by the one resource.

17. The system of claim 13, wherein each of the second set of resources comprises a proficiency level above a third threshold for at least one additional resource attribute and wherein the processor when executing the executable instructions:
predicts, for the time period, an expected number of incoming contacts requiring resources possessing the at least one additional resource attribute;
identifies a second correlation between the first resource attribute and the at least one additional resource attribute; and
based on the first and second correlations, forecasts a minimum number of resources from each of the first set of resources and the second set of resources to handle the expected number of incoming contacts at the predetermined service level for the time period, wherein the minimum number of resources from the first set of resources is less than a number of resources required without the first and second correlations.

18. The system of claim 13, wherein each resource further comprises a plurality of additional resource attributes and wherein the processor when executing the executable instructions:

determines, for a new contact, a plurality of contact attributes;

selects a resource from one of the first set of resources or the second set of resources for connection with the new contact, the selection being based at least in part on a comparison between the plurality of additional resource attributes and the plurality of contact attributes.

19. The system of claim 13, wherein:

predicting the expected number of incoming contacts further comprises predicting:

an expected first number of incoming contacts requiring resources possessing the first resource attribute, the expected first number of incoming contacts historically resulting in scheduling of a first number of resources from the first set of resources to handle the expected first number of incoming contacts at a predetermined service level for the time period; and an expected second number of incoming contacts requiring resources possessing the second resource attribute; and forecasting the minimum number of resources further comprises forecasting a minimum number of resources from each of the first set of resources and the second set of resources to handle the expected first and second number of incoming contacts at the predetermined service level for the time period, wherein the minimum number of resources from the first set of resources is less than the first number of resources.

20. The system of claim 19, wherein the minimum number of resources from the second set of resources is less than a second number of resources from the second set of resources historically scheduled to handle the expected second number of incoming contacts at the predetermined service level for the time period.

* * * * *